UNITED STATES PATENT OFFICE.

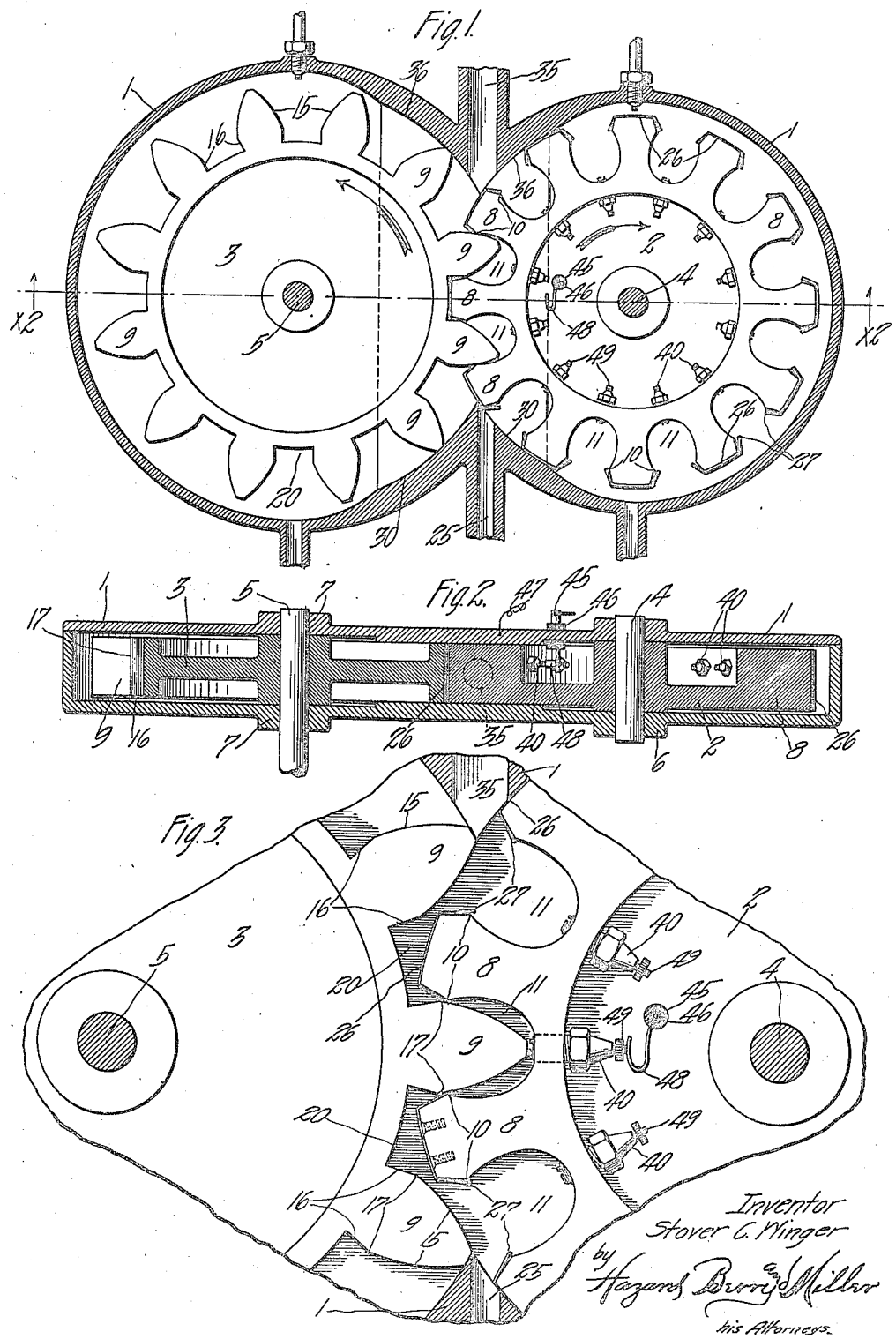

STOVER C. WINGER, OF PASADENA, CALIFORNIA.

ROTARY ENGINE.

1,240,112.

Specification of Letters Patent.   Patented Sept. 11, 1917.

Application filed April 10, 1916. Serial No. 90,189.

*To all whom it may concern:*

Be it known that I, STOVER C. WINGER, a citizen of the United States, residing at Pasadena, in the county of Los Angeles and State of California, have invented new and useful Improvements in Rotary Engines, of which the following is a specification.

This invention relates to rotary engines.

One of the objects of the invention is to provide a rotary combustion engine comprising a pair of intermeshing gears journaled within a casing, the teeth of which gears, when in mesh will respectively and successively form the pistons and combustion chambers of the engine, in which combustion chambers a gaseous fuel is introduced and ignited to act successively upon said pistons to rotate the gears, from the shaft of one of which, power may be taken.

Another object of the invention is to provide an improved rotary combustion engine so constructed as to operate with the highest efficiency and with a minimum amount of wear.

Other objects will appear hereinafter.

A desirable embodiment of the invention is illustrated in the accompanying drawing, which forms a part of this specification, in which:

Figure 1 is a sectional view of the engine, some parts being shown in elevation.

Fig. 2 is a sectional view of the engine taken on line $x^2$—$x^2$ of Fig. 1.

Fig. 3 is a sectional view of the engine similar to Fig. 1 of a portion of the engine on an enlarged scale.

In the drawing, 1 designates the casing of the engine and 2 and 3 designate gears mounted within the casing upon shafts 4 and 5 respectively, journaled in bearings 6 and 7, respectively, on the casing. The gears 2 and 3 are respectively constructed with intermeshing teeth 8 and 9. Each tooth 8 of gear 2 is formed with two opposite engaging edges 10, from which edges the tooth converges outwardly and is curved inwardly to form, in conjunction with the teeth adjacent thereto, enlarged spaces 11 adapted to the outer portion of the teeth 9. Each tooth 9 is formed with outwardly and inwardly converging sides, said sides converging outwardly at 15 and inwardly at 16 from the opposite points 17 of the tooth. Between the side portions 16 of the teeth 9 are formed spaces 20 adapted to receive freely the outer portion of the teeth 8. The outwardly converging portions 15 of the sides of the teeth 9 are adapted to engage the edges 10 of teeth 8 continuously during the intermeshing of the teeth 8 and 9 so that the teeth 9 will close the spaces 11 between the teeth 8 and said spaces will form combustion chambers for the gas which is introduced thereinto through the gas inlet port 25, before the teeth intermesh, which port extends through the lower wall of the engine casing 1. Packing plates 26 are secured to the outer faces of the teeth 8, which plates have side spring wings 27 which extend over the edges 10 of said teeth and are adapted to engage the side portions 15 of the teeth 9 when the teeth 8 and 9 intermesh so as to provide gas tight joints between the side portions 15 of teeth 9 and the edges 10 of teeth 8.

The lower portion of the wall of the casing 1 extends inwardly at 30 so as to contact with the outer faces of the teeth of the gears 8 and 9 and close the spaces between the teeth of the gears at the sides of the inlet 25 to prevent the gas which is introduced into said spaces through said inlet from escaping into the interior of the engine casing at this point.

The engine casing is provided with an outlet 35 at a point opposite the inlet 25 through which the products of combustion escape from the combustion chambers of the gears.

The upper portion of the casing extends inwardly at 36 so as to contact with the outer faces of the teeth of the gears and close the spaces between the teeth of the gears at the sides of the outlet 35 to prevent the products of combustions from said spaces from escaping into the interior of the casing.

Spark plugs 40 are provided on the gear 2 which respectively extend into the spaces 11 between the teeth 8 of said gear. A terminal 45 of an electric ignition circuit, (not shown) extends through the side wall of the casing 1, through insulation bushing 46. The other terminal of said ignition circuit is grounded in the casing 1 at 47. The lower end of said terminal has a contact 48 adapted to be successively engaged by contacts 49 on the inner end of each of the spark plugs 40 during the rotation of the gears, so as to close said circuit, to ignite the gas successively in the spaces 11 between the teeth of the gear 2 as illustrated in Fig. 1.

The operation of the engine is as follows: Gas is introduced through the inlet 25 into the spaces between the gear teeth adjacent the inlet. As the gears rotate, the gear teeth intermesh, and the intermeshing teeth 9 enter and close the spaces 11 between the teeth 8 and confine the gas within said spaces, until said teeth 9 and said spaces are successively rotated above the center of the gears in such position that the plug contact engages the terminal contact, which closes the ignition circuit, whereupon the spark plugs successively ignite the gas in said spaces 11 and the explosion of the gas therein acts upon the teeth 9 as pistons and force said teeth out of said spaces and rotate the gears in the direction of the arrows in Fig. 1. As said teeth 9 are driven out of said spaces by the explosion of the gas therein, the products of combustion escape therefrom through the outlet 35.

Power may be taken from the engine from shaft 5. In taking the power from shaft 5, the friction between the teeth of the gears 2 and 3 is reduced to a minimum, inasmuch as the expanding gas in the combustion chambers 11 acts directly upon the teeth 9 of the gear 3 to drive said gear and no force is applied by the teeth 8 of gear 2 against the teeth 9 of gear 3.

I claim:

1. A rotary combustion engine comprising a casing provided with an inlet and an outlet, a pair of gears rotatively mounted within said casing, the teeth of which gears intermesh, the spaces between the teeth of one of said gears being adapted to receive gas from said inlet, the teeth of the other gear being adapted to enter and close said spaces to compress the gas therein, the teeth of one of said gears being provided with resilient packing means adapted to make a gas tight joint with the teeth of the other gear, and means for successively igniting the confined gas in said successive spaces so that said gas will act upon the teeth of said gears to rotate the gears, the products of combustion being adapted to escape from said spaces through said outlet.

2. A rotary combustion engine comprising a casing provided with an inlet and an outlet, a pair of gears rotatively mounted within said casing, the teeth of which gears intermesh, the spaces between the teeth of one of said gears being adapted to receive gas from said inlet, the teeth of the other gear being adapted to enter and close said spaces to compress the gas therein, a terminal of an electric ignition circuit projecting into said casing, the other terminal of which circuit being grounded in said casing, and a spark plug projecting into each of said spaces of said gear adapted to be rotated by said gear into electrical connection with said terminal to ignite the gas in said spaces successively to rotate the gears, the products of combustion of said gas being adapted to escape through said outlet.

3. A rotary combustion engine comprising a casing provided with an inlet and an outlet, a pair of tooth intermeshing gears rotatively mounted within said casing, the teeth of one of said gears being provided with resilient packing means adapted to make a gas-tight joint with the teeth of the other gear, the spaces between the teeth of one of said gears being adapted to receive gas from said inlet, the casing being so constructed as to engage the teeth of said gears adjacent said inlet to prevent the gas escaping from said spaces, the teeth of the other gear being adapted to enter and close said spaces to compress the gas therein, means for successively igniting the confined gas in said successive spaces so that said gas will act upon the teeth of said gears to rotate the gears, the products of combustion of said gas being adapted to escape from said spaces through said outlet, the casing being so constructed as to engage the teeth of said gears adjacent said outlet to prevent the products of combustion from escaping from said spaces otherwise than through said outlet.

4. A rotary combustion engine comprising a casing provided with an inlet and an outlet, a pair of gears having intermeshing teeth rotatably mounted within said casing, the spaces between the teeth of one of said gears being adapted to receive an explosive gaseous fuel mixture from said inlet, the teeth of the other gear being adapted to enter and close said spaces to confine and compress the gaseous fuel therein, means for successively confining and igniting gaseous fuel mixture in said successive spaces so that said fuel mixture will act upon the teeth to rotate said gears, said means comprising a plurality of spark plugs mounted on one of said gears, there being one for each of the spaces between the teeth of said last mentioned gear, and a stationary contact brush mounted on said casing and adapted to contact successively with said spark plugs at the moment when the fuel mixture in the space between the teeth of the gear, with which it is connected, is at its maximum compression.

In testimony whereof I have signed my name to this specification.

STOVER C. WINGER.